(12) United States Patent
Takada et al.

(10) Patent No.: US 6,628,443 B1
(45) Date of Patent: Sep. 30, 2003

(54) OPTICAL SCANNER

(75) Inventors: Kyu Takada, Osaka (JP); Nozomu Inoue, Nagano (JP); Takeshi Sowa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/597,423

(22) Filed: Jun. 19, 2000

(30) Foreign Application Priority Data

Jun. 23, 1999 (JP) ............................................. 11-176404

(51) Int. Cl.⁷ .............................................. G02B 26/08
(52) U.S. Cl. ........................................ 359/204; 359/216
(58) Field of Search .............................. 359/204–207, 359/216–219

(56) References Cited

U.S. PATENT DOCUMENTS

| | | |
|---|---|---|
| 4,474,422 A | 10/1984 | Kitamura |
| 4,878,066 A | 10/1989 | Shiraishi ..................... 346/108 |
| 6,078,341 A | 6/2000 | Rees et al. ................... 347/129 |

FOREIGN PATENT DOCUMENTS

| | | | |
|---|---|---|---|
| EP | 0 544 002 A1 | 6/1993 | .......... G03G/15/04 |
| EP | 0 661 573 A1 | 7/1995 | .......... G02B/26/10 |
| EP | 0 668 522 A2 | 8/1995 | .......... G02B/26/10 |
| JP | 7-209596 | 8/1995 | .......... G02B/26/10 |
| JP | 9-274151 | 10/1997 | .......... G02B/26/10 |

*Primary Examiner*—James Phan
(74) *Attorney, Agent, or Firm*—Sughrue Mion, PLLC

(57) ABSTRACT

A multi-beam optical scanner includes shaping optics (42) by which a plurality of light beams issued from light emitting portions ($41_1$, $41_2$) are shaped to be substantially parallel in a primary scanning direction, a deflector having reflecting faces (45) that reflect and deflect the plurality of light beams and scanning optics (46) by which the plurality of light beams reflected and deflected by the reflecting faces (45) are scanned across a plane (48) to be scanned as a plurality of adjacent beam spots, wherein the distance from the rear principal plane of the shaping optics (42) to the front principal plane of the scanning optics 46 is expressed by $f_1+f_2$, where $f_1$ and $f_2$ are the focal lengths of the shaping optics (42) and the scanning optics (46), respectively, in the primary scanning direction.

4 Claims, 4 Drawing Sheets

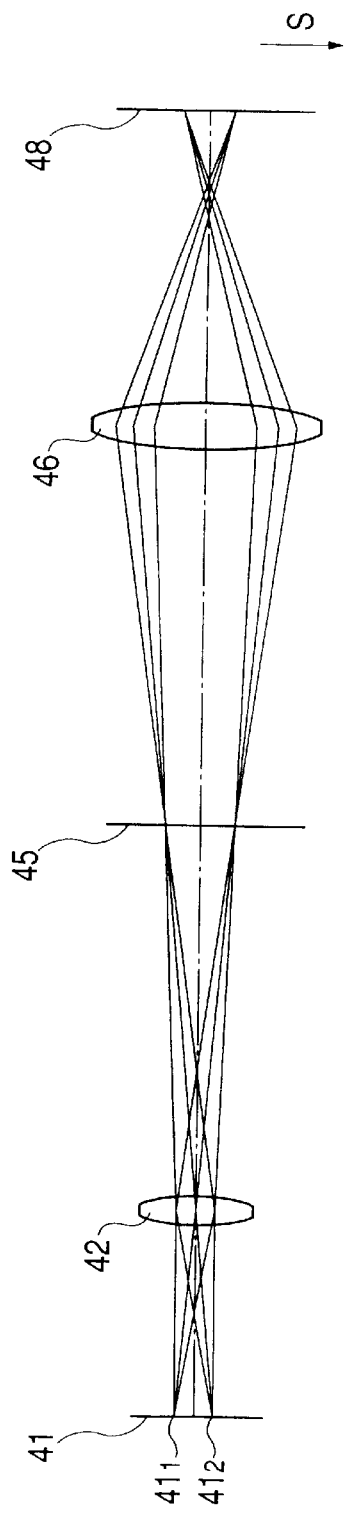
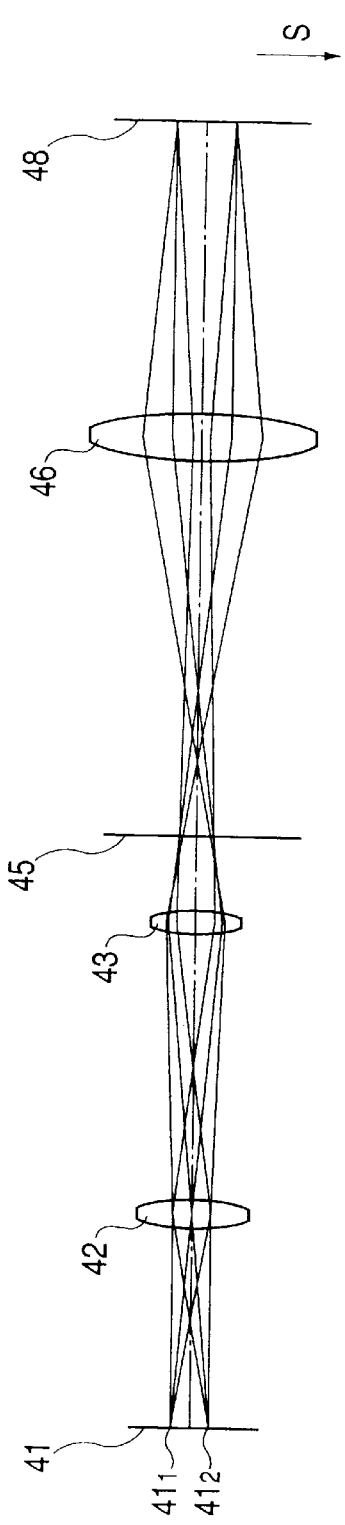

OPTICAL SCANNER

BACKGROUND OF THE INVENTION

The present invention relates to an optical scanner, more particularly to a multi-beam optical scanner.

In a multi-beam optical scanner, the same plane is scanned with a plurality of light beams that are incident on it simultaneously. In order to prevent undesired phenomena such as a variation in distance between adjacent beams on the plane being scanned, it has been proposed in Unexamined Published Japanese Patent Application (kokai) Nos. 274151/1997 and 209596/1995 that optics be provided in such a way that a plurality of light beams are incident on the plane to be scanned parallel to each other in a secondary scanning direction.

A problem with the multi-beam optical scanner is that if the position of the plane to be scanned is shifted along the optical axis, the distance between adjacent light beams varies not only in a secondary scanning direction but also in a primary scanning direction. In particular, in a case where a plurality of light beams are arranged at an angle with respect to scanning lines either one-dimensionally (as shown in FIG. 4a) or two-dimensionally (as shown in FIG. 4b), the variation in distance between adjacent light beams in the primary scanning direction will cause a straight line crossing the scanning lines to be imaged as a jaggy line, and thus a smooth straight line cannot be represented.

SUMMARY OF THE INVENTION

The present invention has been accomplished under these circumstances and has as an object providing a multi-beam optical scanner which is free from the problem of variations in the distance between adjacent light beams in a primary scanning direction notwithstanding a shift of the plane to be scanned along the optical axis.

This object of the present invention can be attained by an optical scanner that deflects a plurality of adjacent light beams across a plane to be scanned in a primary scanning direction and which causes relative movement of the plane to be scanned in a secondary scanning direction perpendicular to the primary scanning direction, wherein said plurality of light beams are allowed to be incident substantially parallel to each other on the plane to be scanned in the primary scanning direction.

The object can also be attained by another optical scanner comprising shaping optics by which a plurality of light beams issued from mutually adjacent light emitting portions are shaped to be substantially parallel at least in a primary scanning direction, a deflector having reflecting faces that reflect and deflect said plurality of light beams and scanning optics by which the plurality of light beams reflected and deflected by the reflecting faces of said deflector are scanned across the plane to be scanned as a plurality of adjacent beam spots, wherein said plurality of light beams cross one another near the front focus of said scanning optics in the primary scanning direction.

The same object can be attained by another optical scanner comprising shaping optics by which a plurality of light beams issued from mutually adjacent light emitting portions are shaped to be substantially parallel at least in a primary scanning direction, a deflector having reflecting faces that reflect and deflect said plurality of light beams and scanning optics by which the plurality of light beams reflected and deflected by the reflecting faces of said deflector are scanned across the plane to be scanned as a plurality of adjacent beam spots, wherein the distance from the rear principal plane of said shaping optics to the front principal plane of said scanning optics is expressed by $f_1+f_2$, where $f_1$ is the focal length of said shaping optics in the primary scanning direction and $f_2$ is the focal length of said scanning optics.

The same object can be attained by yet another optical scanner comprising shaping optics by which a plurality of light beams issued from mutually adjacent light emitting portions are shaped to be substantially parallel at least in a primary scanning direction, a deflector having reflecting faces that reflect and deflect said plurality of light beams and scanning optics by which the plurality of light beams reflected and deflected by the reflecting faces of said deflector are scanned across the plane to be scanned as a plurality of adjacent beam spots, wherein said shaping optics and said scanning optics compose afocal optics in the primary scanning direction.

Any one of these optical scanners is desirably adapted to be such that the plurality of light beams are allowed to be incident substantially parallel to each other on the plane to be scanned in the secondary scanning direction.

In the optical scanners of the invention, a plurality of light beams are allowed to be incident substantially parallel to each other on the plane to be scanned in the primary scanning direction. Therefore, the distance between adjacent light beams does not change in the primary scanning direction even if the plane to be scanned shifts along the optical axis. A plurality of light beams may be arranged either one-dimensionally or two-dimensionally at an angle with respect to scanning lines and yet lines crossing the scanning lines can be drawn as smooth lines in an accurate and consistent manner.

The present disclosure relates to the subject matter contained in Japanese patent application No. Hei. 11-176404 (filed on Jun. 23, 1999), which is expressly incorporated herein by reference in its entirety.

Figure 1:
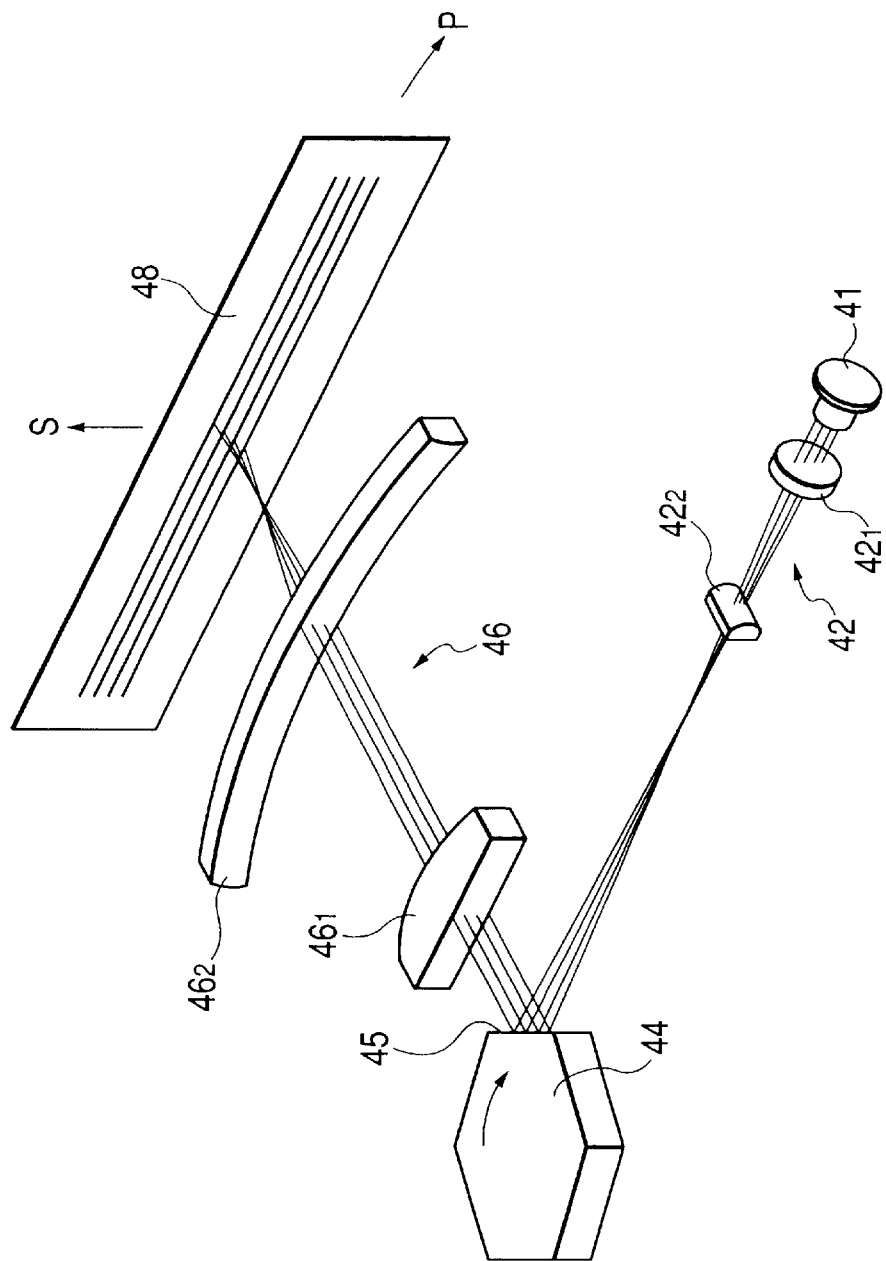
FIG. 1 is a perspective view of the optics in an optical scanner according to the first embodiment of the invention.
Figure 4A:
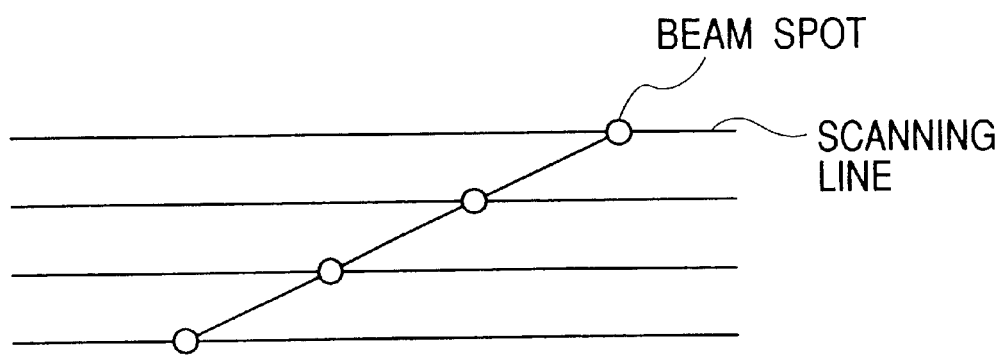
Figure 4B:
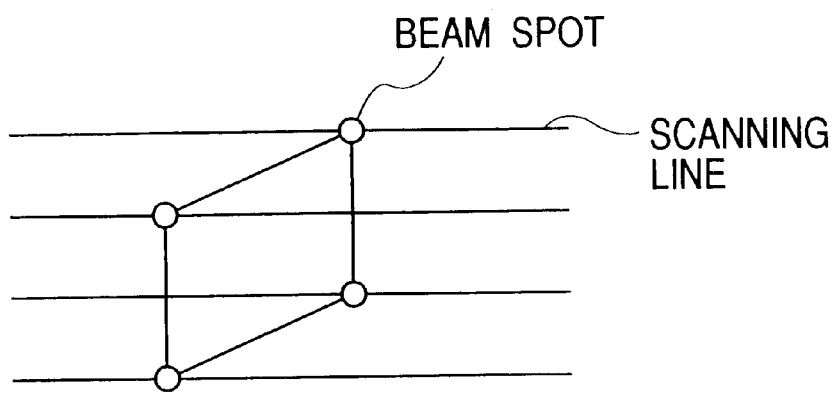

Each of FIG. 3a and FIG. 3b is a developed view showing the optical path of the optics of FIG. 1 in the secondary scanning direction; and Each of FIGS. 4a and 4b shows an arrangement of light beams on the plane to be scanned with a multi-beam optical scanner in which four light beam spots are illustrated as an example.

DESCRIPTION OF THE PREFERRED EMBODIMENT

The optical scanner of the invention is described below with reference to the preferred embodiments.

FIG. 1 is a perspective view of the optics in the optical scanner. Four light beams are issued from a semiconductor laser 41 having four light-emitting portions arranged at an angle with respect to a primary scanning direction P (in FIGS. 2 and 3 which will be discussed later, only two light-emitting portions $41_1$ and $41_2$ are shown). The issued four light beams pass through a collimator lens $42_1$ so that each of the beams is collimated as a parallel beam in both the primary scanning direction P and a secondary scanning direction S. Subsequently, the collimated light beams pass through a cylindrical lens $42_2$ having a positive refractive power only in the secondary scanning direction S so that they are converged only in the secondary scanning direction S. The light beams are incident on a reflecting face 45 of a rotating polygonal mirror 44 such that each of the light beams is parallel in the primary scanning direction P but the beam spot images are focussed on or near the reflecting face 45 in the secondary scanning direction S. The light beams reflected and deflected by the reflecting face 45 pass through a first scanning lens $46_1$ and a second scanning lens $46_2$ so that four beam spots appear on a plane 48 to be scanned, which are aligned at an angle with respect to the primary scanning direction P to form four scanning lines. The first scanning lens $46_1$ is a lens of axial symmetry having a positive refractive power. The second scanning lens $46_2$ is elongated in the primary scanning direction P; it has a positive refractive power in the secondary scanning direction S but has no refractive power in the primary scanning direction P. In the optics design described above, the reflecting face 45 and the plane 48 to be scanned have a conjugated relationship in the secondary scanning direction S so that the beam spot images on or near the reflecting face 45 are focussed on the plane 48 to be scanned. In the primary scanning direction P, the parallel light beams reflected from the reflecting face 45 are converged and focussed on the plane 48 to be scanned. Thus, the optics under consideration is of a conjugate type capable of correcting tilting.

Figure 2:
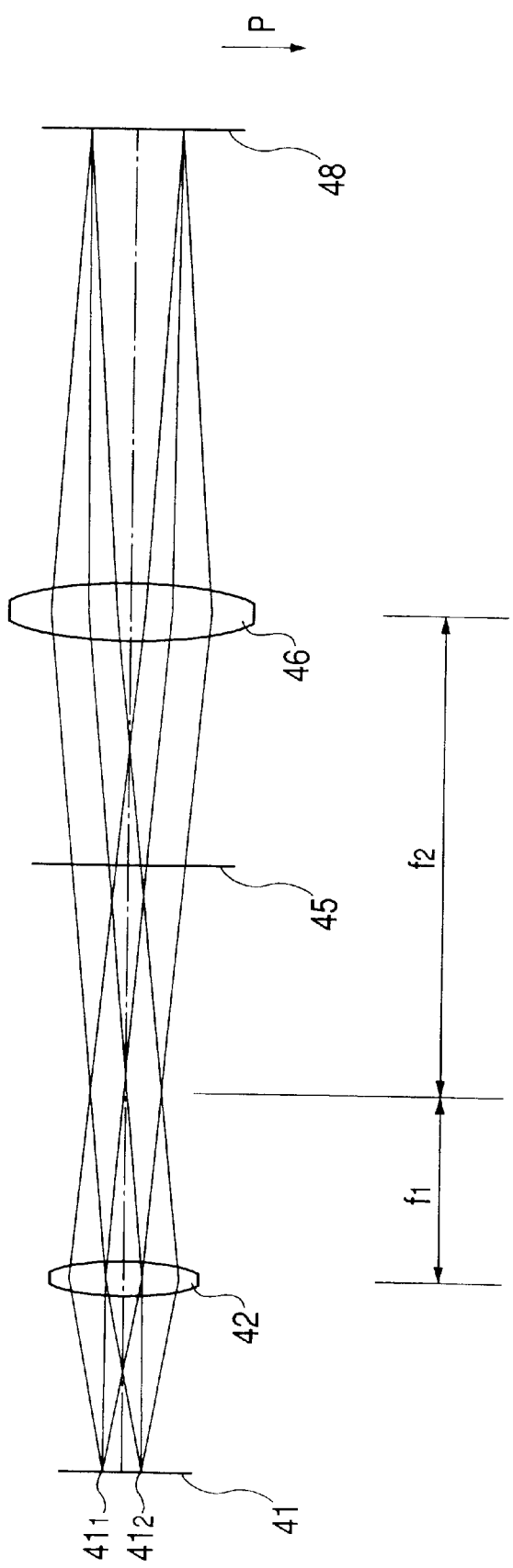
FIG. 2 is a developed view showing the optical path of the optics of FIG. 1 in the primary scanning direction.

The optical path in the optics shown in FIG. 1 is developed in the primary scanning direction as shown in FIG. 2 and developed in the secondary scanning direction as shown in FIG. 3a. For the sake of convenience for explanation, the collimator lens $42_1$ and the cylindrical lens $42_2$ are illustrated as shaping optics 42 that is a single lens having different focal lengths in the primary and secondary scanning directions. Similarly, the first scanning lens $46_1$ and the second scanning lens $46_2$ are illustrated as scanning optics 46 that is a single lens having different focal lengths in the primary and secondary scanning directions.

In the primary scanning direction of the optics (see FIG. 2), the semiconductor laser 41 having two light-emitting portions $41_1$ and $41_2$ is located at the front focal plane of the shaping optics 42. If the focal length of the shaping optics 42 in the primary scanning direction is written as $f_1$ and the focal length of the scanning optics 46 in the primary scanning direction as $f_2$, the principal points of the shaping optics 42 and the scanning optics 46 are spaced apart by $f_1+f_2$ so that the rear focal point of the shaping optics 42 coincides with the front focal point of the scanning optics 46. The plane 48 to be scanned substantially coincides with the rear focal plane of the scanning optics 46.

In the secondary scanning direction of the optics (see FIG. 3a), the semiconductor laser 41 having two light-emitting portions $41_1$ and $41_2$ is located away from the front focal point of the shaping optics 42 and located at a conjugated position relative to the reflecting face 45 of the rotating polygonal mirror 41 with respect to the shaping optics 42 so that the images of the light-emitting portions $41_1$ and $41_2$ are focussed on or near the reflecting face 45. Similarly, the reflecting face 45 is located at a conjugated position relative to the plane 48 to be scanned with respect to the scanning optics 46 so that the images of the light-emitting portions $41_1$ and $41_2$ are focussed on the plane 48 to be scanned as secondary images.

Given this layout, the shaping optics 42 and the scanning optics 46 compose afocal optics in the primary scanning direction, so that the principal rays of the light beams issued from the light-emitting portions $41_1$ and $41_2$ cross each other at a point near the front focal point of the scanning optics 46 and are incident on the plane 48 to be scanned such that axes of light beams are substantially parallel to each other. Therefore, even if the plane 48 to be scanned shifts in the optical axis direction when the polygonal mirror 44 rotates clockwise (as indicated by the arrow in FIG. 1) to scan a plurality of light beams across the plane 48 to be scanned in the primary scanning direction P while relatively moving the plane 48 to be scanned in the secondary scanning direction S, the distance between adjacent light beams will not change in the primary scanning direction. Consequently, lines crossing the scanning lines can be drawn as smooth lines even if a plurality of light beams are arranged either one-dimensionally or two-dimensionally at an angle with respect to the scanning lines as shown in FIG. 4.

This is not the case in the secondary scanning direction and given the layout shown in FIG. 3a, the distance between adjacent light beams (the distance between the scanning lines) in the secondary scanning direction varies if the plane 48 to be scanned shifts in the optical axis direction. To deal with this problem, the layout may be modified as shown in FIG. 3b; a relay lens 43 having a positive power only in the secondary scanning direction is provided between the shaping optics 42 and the reflecting face 45 of the rotating polygonal mirror 44 to ensure that the semiconductor laser 41 is allowed to have a conjugate relationship with the reflecting face 45 of the polygonal mirror 44 by the combination of the shaping optics 42 and the relay lens 43 so that the images of the light-emitting portions $41_1$ and $41_2$ are focussed on or near the reflecting face 45 and the principal rays of the light beams cross each other at a point near the front focal point of the scanning optics 46. As a result, the principal rays of the light beams are incident on the plane 48 to be scanned to be substantially parallel to each other in the secondary scanning direction as well as in the primary scanning direction. Even if the plane 48 to be scanned shifts in the optical axis direction, the distance between adjacent light beams will not change in the secondary scanning direction and smooth lines can be drawn in a more accurate and consistent manner.

While the optical scanner of the invention has been described above with reference to the preferred embodiments, it should be understood that these are not the sole cases of the invention and various modifications are possible without departing from the spirit and scope of the invention.

As will be apparent from the foregoing description, the optical scanner of the invention is adapted to be such that a plurality of light beams are allowed to be incident substantially parallel to each other on a plane to be scanned in a primary scanning direction. Therefore, the distance between adjacent light beams will not change in the primary scanning direction even if the plane to be scanned shifts along the optical axis; as a result, lines crossing the scanning lines can be drawn as smooth lines in an accurate and consistent manner even if a plurality of light beams are arranged either one-dimensionally or two-dimensionally at an angle with respect to the scanning lines.

What is claimed is:

1. An optical scanner that deflects a plurality of adjacent light beams across a plane to be scanned in a primary scanning direction and which causes relative movement of the plane to be scanned in a secondary scanning direction perpendicular to the primary scanning direction, wherein said plurality of light beams are allowed to be incident substantially parallel to each other on the plane to be scanned in the primary scanning direction, wherein said plurality of light beams are arranged two-dimensionally on said plane, and wherein said plurality of light beams are allowed to be incident substantially parallel to each other on the plane to be scanned in the secondary scanning direction.

2. An optical scanner comprising shaping optics by which a plurality of light beams issued from mutually adjacent light emitting portions are shaped to be substantially parallel at least in a primary scanning direction, a deflector having reflecting faces that reflect and deflect said plurality of light beams and scanning optics by which the plurality of light beams reflected and deflected by one of the reflecting faces of said deflector are scanned across the plane to be scanned as a plurality of adjacent beam spots, wherein said plurality of light beams cross one another near a front focal point of said scanning optics in the primary scanning direction, wherein said plurality of light beams are arranged two-dimensionally on the plane, and wherein said plurality of light beams are allowed to be incident substantially parallel to each other on the plane to be scanned in the secondary scanning direction.

3. An optical scanner comprising shaping optics by which a plurality of light beams issued from mutually adjacent light emitting portions are shaped to be substantially parallel at least in a primary scanning direction, a deflector having reflecting faces that reflect and deflect said plurality of light beams and scanning optics by which the plurality of light beams reflected and deflected by one of the reflecting faces of said deflector are scanned across the plane to be scanned as a plurality of adjacent beam spots, wherein the distance from a rear principal plane of said shaping optics to a front principal plane of said scanning optics is expressed by $f_1+f_2$, where $f_1$ and $f_2$ are the focal lengths of said shaping optics and said scanning optics, respectively, in the primary scanning direction, wherein said plurality of light beams are arranged two-dimensionally on the plane, and wherein said plurality of light beams are allowed to be incident substantially parallel to each other on the plane to be scanned in the secondary scanning direction.

4. An optical scanner comprising shaping optics by which a plurality of light beams issued from mutually adjacent light emitting portions are shaped to be substantially parallel at least in a primary scanning direction, a deflector having reflecting faces that reflect and deflect said plurality of light beams and scanning optics by which the plurality of light beams reflected and deflected by one of the reflecting faces of said deflector are scanned across the plane to be scanned as a plurality of adjacent beam spots, wherein said shaping optics and said scanning optics compose afocal optics in the primary scanning direction, wherein said plurality of light beams are arranged two-dirriensionally on the plane, and wherein said plurality of light beams are allowed to be incident substantially parallel to each other on the plane to be scanned in the secondary scanning direction.

* * * * *